United States Patent [19]

Fecik et al.

[11] Patent Number: 4,556,408
[45] Date of Patent: Dec. 3, 1985

[54] DUAL RING SEGMENTED BLOCK TEMPERING RING

[75] Inventors: Michael T. Fecik, Pittsburgh; Robert G. Frank, Franklin Township, Westmoreland County, John J. Ewing, Tarentum, all of Pa.

[73] Assignee: PPG Industries, Inc., Pittsburgh, Pa.

[21] Appl. No.: 637,103

[22] Filed: Aug. 2, 1984

[51] Int. Cl.$^4$ ............................................. C03B 23/02
[52] U.S. Cl. ...................... 65/289; 65/273; 65/291
[58] Field of Search ................. 65/289, 290, 291, 273, 65/348

[56] References Cited

U.S. PATENT DOCUMENTS

| | | | |
|---|---|---|---|
| 3,089,319 | 5/1963 | Carson et al. | 65/288 |
| 3,163,514 | 12/1964 | Golightly | 65/288 |
| 3,168,391 | 2/1965 | Malobicky et al. | 65/107 |
| 3,741,743 | 6/1973 | Seymour | 65/287 |
| 3,846,104 | 11/1974 | Seymour | 65/104 |
| 3,973,943 | 8/1976 | Seymour | 65/348 |

FOREIGN PATENT DOCUMENTS

| | | | |
|---|---|---|---|
| 1089973 | 10/1954 | France | 65/291 |
| 839229 | 6/1960 | United Kingdom | 65/290 |

Primary Examiner—Arthur Kellogg
Attorney, Agent, or Firm—Andrew C. Siminerio

[57] ABSTRACT

A tempering ring for supporting a hot shaped glass sheet during tempering has inner and outer rings conforming in shape and outline to that of the hot glass sheet. Individual glass sheet support members are mounted around the perimeter of the tempering ring so that the glass sheet support surfaces of the support members define a peripheral contour similar to that of the hot shaped glass sheet. The glass sheet support members are each adjusted in both a longitudinal and vertical direction.

18 Claims, 11 Drawing Figures

DUAL RING SEGMENTED BLOCK TEMPERING RING

BACKGROUND OF THE INVENTION

1. Related Application

This application is related to application U.S. Ser. No. 637,102 filed even date entitled TEMPERING RING WITH PIVOTING GLASS SHEET SUPPORT MEMBER.

2. Field of the Invention

This invention relates to a tempering ring for supporting glass sheets and more specifically to a tempering ring that supports a hot shaped glass sheet on individually adjustable glass sheet support members.

BRIEF DESCRIPTION OF THE PRESENTLY AVAILABLE TECHNOLOGY

The following patents relate to the handling of hot shaped glass sheets. Although some deal with glass bending techniques in general and others with tempering rings, all present apparatuses that support hot shaped glass sheets.

U.S. Pat. No. 3,163,514 to Golightly and U.S. Pat. No. 3,168,391 to Malobicky and Barch teach the use of dual rails on a skeletonized mold for a glass bending apparatus. The inner metal rail is notched and its top surface rail is disposed higher than that of the outer metal rail so that the glass sheet is supported directly and entirely by the inner rail.

U.S. Pat. No. 3,089,319 to Carson and White teaches a glass bending apparatus that includes a dual rail frame having a nonmetallic inner rail, such as Marinite or graphite, that will not fuse with the glass sheet during bending. As in the previously discussed patents, the rails are continuous except at the mold bend points.

U.S. Pat. No. 3,741,743 to Seymour teaches a shaping frame for both shaping and tempering operations. Dual steel rails support the glass sheet at its perimeter and are bridged by layers of steel mesh. The mesh must be sized so that it is strong enough to bridge the gap between the rails and support the glass sheet and open enough to allow adequate air circulation during tempering. The mesh is secured to the dual rail with wire elements.

U.S. Pat. No. 3,846,104 to Seymour teaches a shaping mold and a tempering ring. The lower outlining shaping mold is a stainless steel ring with a T-shaped cross section. The upper surface of the T-shaped ring is bonded to a refractory facing so as not to mar the heat softened glass during the shaping operation. The head section of the T member is continuous in the direction of the length of the rail. The tempering ring includes a single stainless steel rail with notched edges for direct support of the glass during tempering and with holes through it to increase air flow circulation.

U.S. Pat. No. 3,973,943 to Seymour teaches that the use of metal rails to contact a shaped glass sheet during a tempering operation has drawbacks. The difference in the cooling rates between the glass sheet and metal support sets up a retarded cooling rate at the glass to metal interface. This difference between the glass sheet cooling rate and the retarded cooling rate where the glass sheet rests directly on the rail (or rail section if it is notched) results in surface tensions in the glass which may result in breakage. To minimize or eliminate this problem, Seymour teaches a composite rail member including two side-by-side continuous rails with no spacing between them. The inner rail is a nonmetallic material having a lower heat transfer coefficient than the rigid steel outer rail to which it is mounted against. The upper edge of the inner rail is disposed above the upper edge of the outer steel rail so that only the inner rail contacts the shaped glass sheet.

All the discussed patents work adequately in normal shaping and tempering operations. A common problem associated with the support rings or rails of each patent is the need to have the edge of the tempering ring that supports the hot shaped glass sheet conform with the contours of the glass sheet as close as possible to provide a glass sheet support having a desired shape. This requires precise machining of glass support ring sections. It would be advantageous to have a tempering ring that supports the glass sheet with easily replaceable individual glass sheet support members that can be adjusted both longitudinally and vertically for fine adjustment to conform with the glass sheet contours thus minimizing if not eliminating any machining of the glass sheet support members.

As used herein, "longitudinal" adjustment means movement along a sheet support rail or rails about the central axis of the tempering ring. As used herein, "vertical" adjustment means up and down movement relative to the upper surface of a sheet support rail or rails.

SUMMARY OF THE INVENTION

This invention provides an apparatus for supporting a hot shaped glass sheet of given shape and outline during thermal treatment. A support rail includes inner and outer rings. The inner ring is located a short distance inboard of the periphery of the glass sheet. The outer ring encircles the inner ring and is a short distance outboard of the periphery of the glass sheet. The inner and outer rings are aligned with each other and each has an upper edge surface which conforms in outline and contour to the shape of the glass sheet. Spacing facilities in the form of hold down plates located around the perimeter of the rings interconnect and maintain the rings in a predetermined spaced relationship. A plurality of discrete glass sheet support members each having a contact block are individually mounted around the ring so that their glass sheet support surfaces define a peripheral contour similar to that of the hot shaped glass sheet to be supported thereon.

Another embodiment of this invention provides glass sheet support members having a stem section and a cap section to define a monolithic T-shaped member. The T-shaped members are distributed around the perimeter of the rings with its stem section maintaining spacing between the inner and outer rings. The T-shaped members are mounted and retained at a given position on the perimeter of the rings by an adjusting bolt passing through one of a set of adjusting bolt holes in the rings and an opening in the stem section. An adjusting bolt nut is used to secure the adjusting bolt in place. A series of the sets of adjusting bolt holes along the perimeter of the rings allows the T-shaped member to be longitudinally adjusted and mounted at any adjusting bolt holes location. The opening in the stem section is slot-shaped along the vertical direction of the stem member so that the T-shaped member can be adjusted vertically. The cap section extends above the rings to support the hot shaped glass sheet.

In order to minimize or eliminate the cooling rate difference between the hot shaped glass sheet and the glass/support interface the contact blocks and T-shaped members are composed of nonmetallic material having a low coefficient of thermal conductivity, such as glass ceramic composites or silica composites. Since the coefficient of thermal conductivity can be defined by the amount of heat in BTU's which will flow through a layer of material 1 square foot in area when the temperature difference between the surfaces of the layer is 1° F. per foot of thickness, it follows that as the coefficient of thermal conductivity decreases, the amount of heat transfer decreases. As a result the material will retain its heat for a longer period of time. A material with a low coefficient of thermal conductivity will limit the heat transfer from the glass to the support member and thus reduce the cooling rate differential.

DETAILED DESCRIPTION OF THE INVENTION

Figure 1:
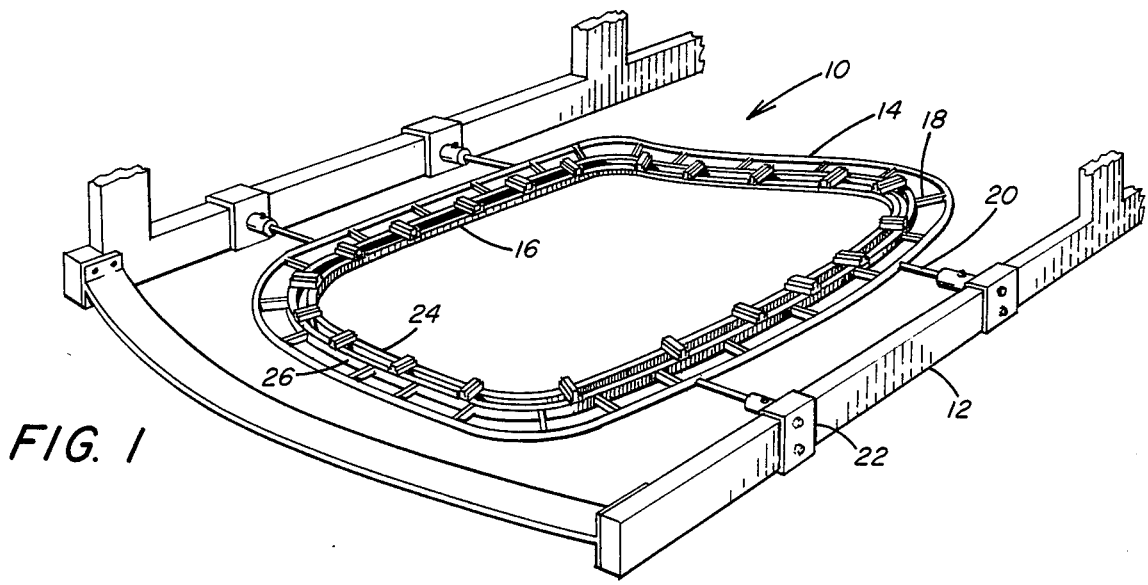
FIG. 1 is a perspective view of a tempering ring incorporating features of the invention for handling a hot shaped glass sheet during tempering.
Figure 2:
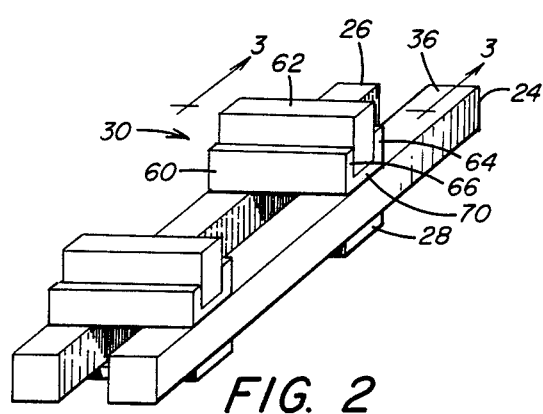
FIG. 2 is a fragmented view of the tempering ring illustrating the glass sheet supporting members and support rail.

FIG. 1 shows dual ring tempering ring 10, incorporating features of the invention, supported by carriage 12 in any convenient manner. For example, and not limited to the invention, the tempering ring 10 is reinforced by member 14 which encircles glass sheet support rail 16 and connected thereto by ring struts 18. The member 14 is connected to the carriage 12 by tempering ring supports 20 and carriage connector 22. The peripheral contours of glass sheet support rail 16 are generally similar the peripheral outline of the glass sheet (not shown) to be supported thereon. The glass sheet support rail 16 includes a continuous inner ring 24 and a continuous outer ring 26 held apart in a spaced relationship by hold-down plates 28. Although not limited to the invention, the rings 24 and 26 are preferably solid stainless steel bars with a square cross-section. Glass sheet support member 30 each having an elevator 32 (see FIG. 3) are distributed along the perimeter of the glass sheet support rail 16.

The inner ring 24 has an outline and shape substantially similar to that of hot shaped glass sheet 34 at locations a short distance inboard of the sheet perimeter. Upper edge surface 36 of the inner ring 24 as viewed in FIG. 3 remains relatively parallel with lower glass surface 38 of the glass sheet 34 at its perimeter. Outer ring 26 is located radially outward of the inner ring 24 a short distance outboard of the glass sheet 34 perimeter, and generally parallel to the inner ring 24. Upper edge surface 40 of the outer ring 26 is relatively parallel with the lower glass surface 38. As a result, the upper surfaces 36 and 40 of the rings 24 and 26, respectively, are aligned with each other and parallel to the lower glass surface 38 at its perimeter. Absolute parallelism between the upper surfaces 36 and 40 and the lower glass support 38 is not required. It should be noted that although the preferred embodiment shows the rings 24 and 26 to be square in crosssection, the rings 24 and 26 can be any cross-section configuration such as circular, as long as they are sufficiently rigid to support the glass sheet 34 during thermal treatment with minimal deformation.

Figure 3:
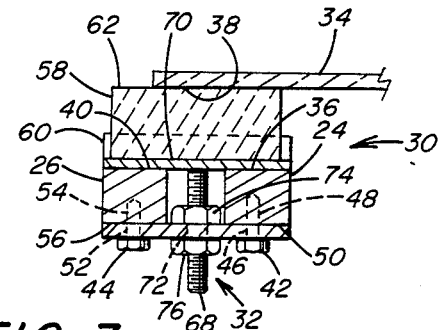
FIG. 3 is a cross-sectional view, along lines 3—3 of FIG. 2 with portions removed for clarity and illustrating an edge portion of a glass sheet supported thereon.
Figure 4:
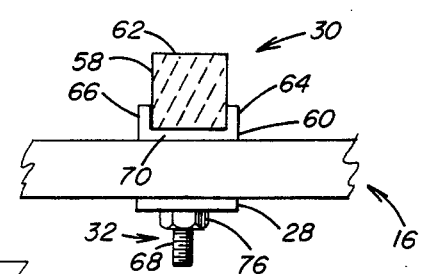
FIG. 4 is a side view of one glass supporting member illustrated in FIG. 2.
Figure 5:
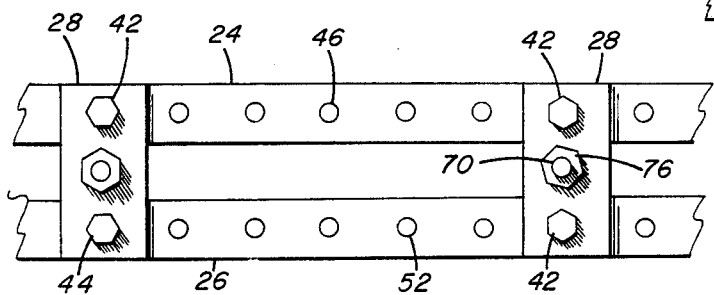
FIG. 5 is a bottom view of the glass supporting members illustrated in FIG. 2.

With reference to FIGS. 2 through 5 and particularly to FIGS. 3 through 5, the hold-down plate 28 connects the inner ring 24 to the outer ring 26 and supports the glass sheet support member 30 for adjustment by the elevator 32, in a manner to be discussed later. As illustrated in FIGS. 3 and 5, each hold-down plate 28 is connected to the rings 24 and 26 by threaded fasteners 42 and 44, respectively. Hole 46 in the plate 28 (see FIG. 3) is aligned with one of a plurality of holes 48 in lower surface 50 of the inner ring 24 and hole 52 of the plate 28 is aligned with one of a plurality of holes 54 in lower surface 56 of the outer ring 26 (see FIG. 5). When the fasteners 42 and 44 are inserted through the holes 46 and 52 and into the selected holes 48 and 54, the inner ring 24 is rigidly connected to the outer ring 26 and held apart a predetermined distance. This separation allows for additional air circulation during tempering. The holes 48 and 54 are spaced around the inner ring 24 and the outer ring 26, respectively, allowing longitudinal adjustment of the hold-down plates 28 by the hold-down plates 28 along the perimeter of the glass sheet support rail 16.

The glass sheet support members 30 are distributed along the perimeter of the rings 24 and 26. As shown in FIGS. 3 and 4, the glass sheet support member 30 includes contact block 58 which is seated in and secured to, by any convenient method, channel 60, with its glass sheet supporting surface 62, extending above channel flanges 64 and 66. The channel 60 bridges the upper surfaces of the rings 24 and 26, aligned with a hold-down plate 28 as shown in FIG. 3.

The elevator 32 includes threaded rod 68 which is rigidly attached to and extends from the channel web 70, between rings 24 and 26, and through hole 72 in the hold-down plate 28. Nuts 74 and 76 are each threadedly engaged with the rod 68 about the hold-down plate 28 to capture the hold-down plate 28 therebetween. Loosening and tightening the nuts 74 and 76 secures the hold-down plate 28 therebetween and provides for fine vertical adjustments to the glass sheet support member 30.

Figure 6:
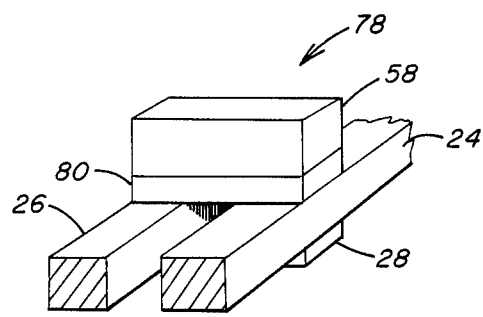
FIG. 6 is a view similar to that of FIG. 2 illustrating an alternate embodiment of a glass sheet supporting member.

FIG. 6 illustrates an alternate glass sheet support member 78 similar to that illustrated in FIGS. 1 through 5. The contact block 58 of the member 78 is bonded to contact block support plate 80 in any convenient manner wherein the contact block 58 of the glass support member 30 is secured in the channel 60.

Of support members 30 and 78, channel 60, plate 80, hold-down plate 28, fasteners 42 and 44, rod 68, nuts 74 and 76, and other assorted components, are preferably metal, e.g. stainless steel, but can be made of any material that is structurally stable during thermal treatment of glass. The contact block 58 is preferably a nonmetallic material, such as glass ceramic composites or silica composites, having a coefficient of thermal conductivity lower than that of the assorted components. In the preferred embodiment, the contact block 54 has a coefficient of thermal conductivity less than 2 BTU/hr/ft$^2$/°F./ft.

Figure 8:
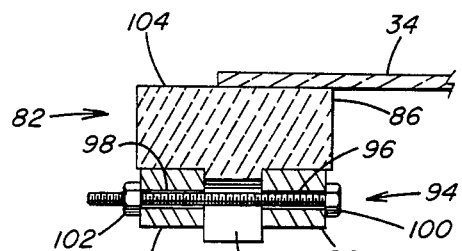
FIG. 8 is a view taken along line 8—8 of FIG. 7 illustrating an edge portion of a glass sheet supported thereon.
Figure 9:
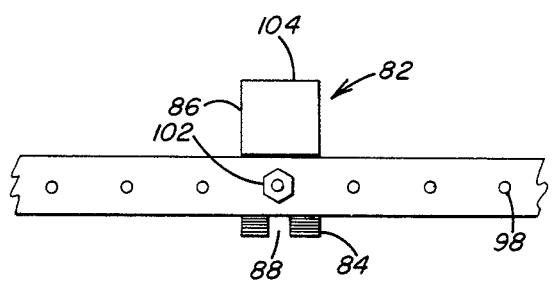
FIG. 9 is a side view of a glass sheet supporting member illustrated in FIG. 7.
Figure 7:
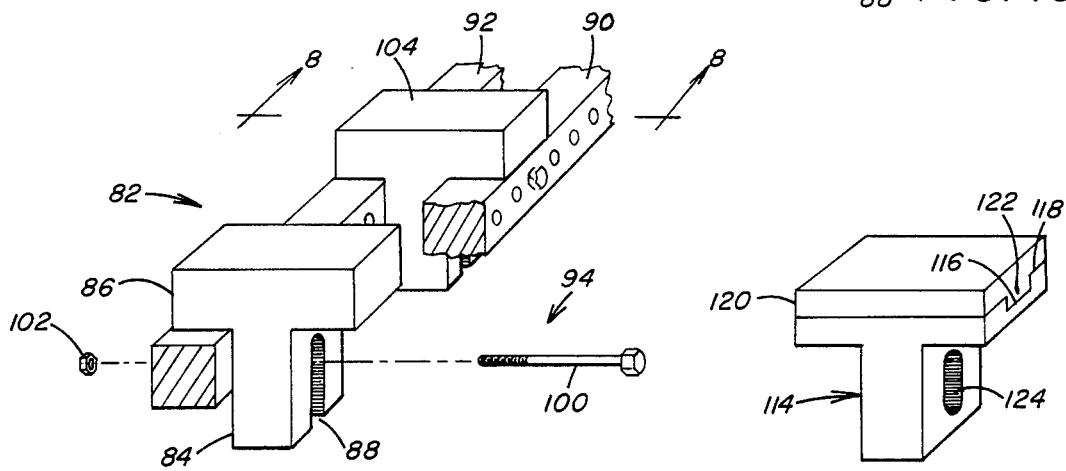
FIG. 7 is a view similar to that of FIG. 2 illustrating an alternate embodiment of the tempering ring and glass supporting members.

FIGS. 7 through 9 illustrate another embodiment of the tempering ring 10 which includes a glass sheet support member 82. The member 82 includes stem section 84 and cap section 86 to define a monolithic T-shaped member. The stem section 84 having an open ended slot 88 fits between inner ring 90 and outer ring 92, secured therebetween by connection assembly 94. The cap section 86 extends above and spans across the rings 90 and 92. The rings 90 and 92 each have a series of holes 96 and 98 respectively, distributed around the perimeter of the rings 90 and 92 as shown in FIGS. 7 and 9. Adjusting bolt 100 of the connection assembly 94 passes through aligned sets of the holes 96 and 98 of the rings 90 and 92, respectively, and the slot 88 of the stem 84 and is secured therein by threaded nut 102. The longitudinal position of the members 82 can be adjusted by moving the stem section 84 in a longitudinal direction between the rings 90 and 92 to any set of aligned holes 96, 98. The vertical position of the member 82 can be adjusted by loosening the threaded nut 102 on the adjusting bolt 100, vertically sliding the member 82 relative to the rings and thereafter retightening the nut 102. Upper surface 104 of the member 82 supports the hot glass sheet 36 during tempering. In its preferred embodiment member 82 is a nonmetallic material with a coefficient, of thermal conductivity less than 2 BTU/hr/ft$^2$/°F./ft, such as glass ceramic composites or silica composites.

Figure 10:
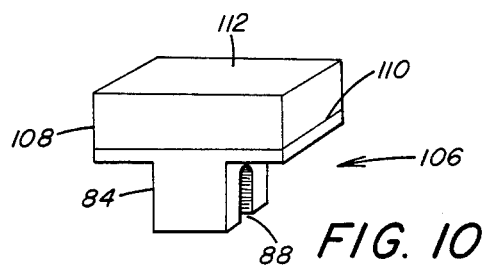
FIG. 10 is an isometric view of an alternate embodiment of a glass sheet supporting member.
Figure 11:
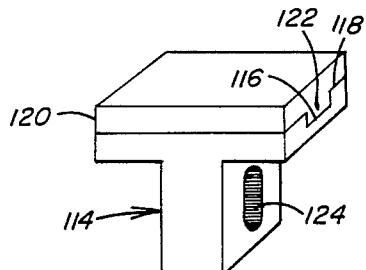
FIG. 11 is an isometric view of still another embodiment of a glass sheet supporting member.

FIGS. 10 and 11 show a different embodiment of glass sheet support members. In FIGS. 10 the glass sheet supporting member 106 includes the T-shaped member 82 having a contact block 108. Contact block 108 is connected to upper surface 110 of the member 82 in any convenient manner. In this embodiment the member 82 is preferably made of metal, e.g., stainless steel and the contact block 108 is a nonmetallic material having a coefficient thermal conductivity lower than that of the member 82. Upper block surface 112 of the block 108 supports the glass sheet 34 during tempering. In FIG. 11 T-shaped member 114 is similar to the member 106 of FIG. 10 except that a groove 116 is formed in its upper surface 118. Contact block 120 has a complimentary rib 122 positioned and secured therein to increase contact surface between the block 120 and surface 118. In place of the open slot 88 as shown in the stem of member 106 of FIG. 10, the stem of member 114 has a closed ended slot 124.

As can now be appreciated variations become apparent to one of ordinary skill in the art. Accordingly, the invention is not to be limited to the specific embodiments illustrated and described herein and the true scope and spirit of the invention are to be determined by reference to the appended claims.

We claim:

1. Apparatus for supporting a hot shaped glass sheet of given size and outline during thermal treatment:

a support rail means;

a plurality of discrete glass sheet support members each having a glass sheet supporting surface;

means for slidably mounting each of said support members for movement along the length of said support rail means; and means for detachably securing each of said support members at desired locations, in spaced relation to one another, along said support rail means wherein said glass sheet supporting surfaces of said support members define a peripheral contour similar to that of said hot shaped glass sheets to be supported thereon.

2. The apparatus as in claim 1 wherein said support rail includes at least one support ring generally conforming in outline and contour to the periphery of said shaped glass sheet.

3. The apparatus as in claim 2 wherein said support rail includes an inner ring having an inner ring upper edge surface conforming in outline and contour to the shape of said glass sheet and located a short distance inboard of the periphery of said glass sheet, an outer ring disposed radially outwardly of said inner ring, a short distance outboard of the periphery of said glass sheet, said outer ring having an outer ring upper edge surface conforming in outline and contour to the shape of said glass sheet with the upper surfaces of said inner and outer rings aligned with and generally paralleling one another and spacing means maintaining said rings a predetermined space apart.

4. The apparatus as in claim 3 wherein said individually mounting means includes means for longitudinal adjusting said glass sheet support members and means for vertical adjusting said glass sheet support members.

5. The apparatus as in claim 4 wherein said spacing means includes a plurality of hold-down plates spaced around the perimeter of said inner and outer rings, and means for securing said hold-down plates to lower edge surfaces of said rings to maintain the space therebetween.

6. The apparatus as in claim 5 wherein at least one of said glass sheet support members includes a channel member positioned relative to said rings directly over one of said hold-down plates with a back face of said channel member facing and overlaying the upper edge surface of said rings, and wherein said glass sheet support surface is a surface of a contact block secured in said channel member.

7. The apparatus as in claim 6 wherein said hold-down plate has a hold facing the space between the rings and said vertical adjusting means includes a rod having a threaded portion, said rod having one end secured to said back face of said channel and said threaded portion passing through said hole in said hold-down plate, and a pair of nuts mounted on each side of said hole in said hold-down plate and threaded on said threaded portion of said rod.

8. The apparatus as in claim 7 wherein said longitudinal adjusting means includes a plurality of holes in said lower edge surface of said rings for receiving fasteners, said fasteners securing portions of said hold-down plates to one of said inner and outer rings.

9. The apparatus as in claim 8 wherein said channel member has a coefficient of thermal conductivity and said contact block is composed of a material having a coefficient of thermal conductivity lower than the coefficient of thermal conductivity of said channel member.

10. The apparatus as in claim 5 wherein at least one of said glass sheet support member includes a contact block support plate positioned directly over one of said hold-down plates and spanning said space between said rings, and a contact block, having said glass sheet support surface secured to said support plate for supporting with the peripheral edge of said hot shaped glass sheet.

11. The apparatus as in claim 10 wherein said hold-down plate has a hole facing the space between the rings and said vertical adjusting means includes a rod having a threaded portion, said rod having one end secured to a lower face of said plate and said threaded portion passing through said hole in said hold-down plate, and a pair of nuts mounted on each side of said hole in said hold-down plate and threaded on said threaded portion of said rod.

12. The apparatus as in claim 11 wherein said longitudinal adjusting means includes a plurality of holes in said lower edge surfaces of said rings for receiving fasteners, said fasteners securing portions of said hold-down plates to one of said inner and outer rings.

13. The apparatus as in claim 12 wherein said support plate has a coefficient of thermal conductivity and said contact block is composed of a material having a coefficient of thermal conductivity lower than the coefficient of thermal conductivity of said support plate.

14. The apparatus as in claim 4 wherein at least one of said glass sheet support members includes a T-shaped member having a stem section and a cap section, said spacing means includes said stem section having an opening therein, a plurality of holes passing through each of said rings with one of said holes of said inner ring aligned with one of said holes in said outer ring, and a nut and bolt assembly sized to pass through a set of the aligned holes in said rings and the opening in said stem section to urge the rings together against said stem section to maintain the spacing between said rings and to prevent movement of said glass sheet support members in a longitudinal direction.

15. The apparatus as in claim 14 wherein said cap section of said T-shaped member is integrally formed with said stem member and extends above said rings such that an upper face of said cap section is generally aligned with a set of the aligned holes in said rings.

16. The apparatus as in claim 15 wherein said said vertical adjusting means includes said holes in said rings, said nut and bolt assembly, and said opening in said stem of said T-shaped member.

17. The apparatus as in claim 16 wherein said T-shaped member has a coefficient of thermal conductivity and further including a contact block with a lower surface fixedly connected to said upper face of said cap section of said T-shaped member, said contact block having an upper surface being said glass sheet support surface, said contact block having a coefficient of thermal conductivity lower than the coefficient of thermal conductivity of said T-shaped member.

18. The apparatus as in claim 16 wherein said inner and outer rails have a coefficient of thermal conductivity, and said T-shaped member has a coefficient of thermal conductivity lower than the coefficient of thermal conductivity of said rails, and further wherein said upper surface of said cap section is said glass sheet support surface.

* * * * *